UNITED STATES PATENT OFFICE.

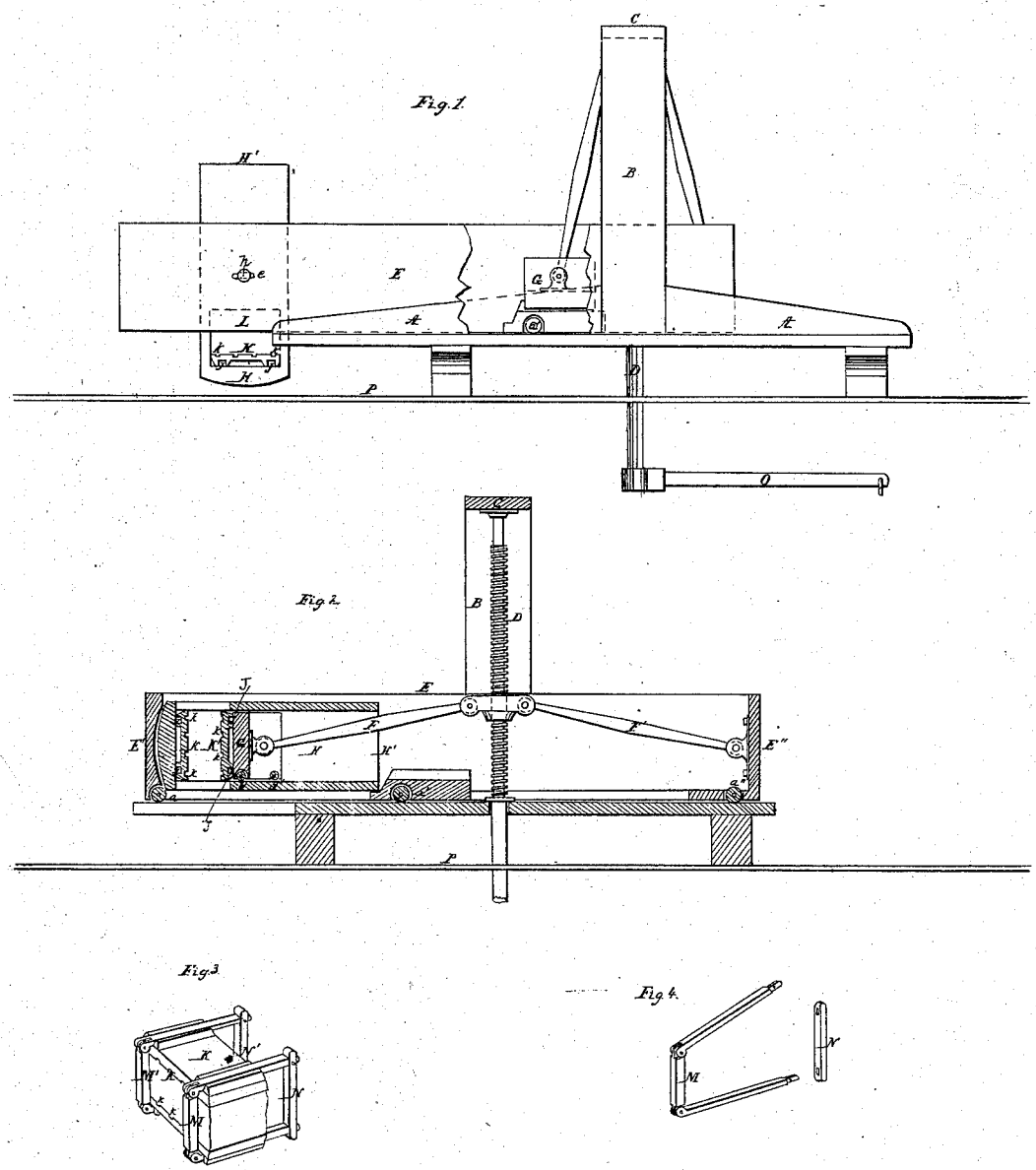

WALDO P. CRAIG, OF MILTON, KENTUCKY.

IMPROVEMENT IN BALING-PRESSES.

Specification forming part of Letters Patent No. 48,523, dated July 4, 1865.

*To all whom it may concern:*

Be it known that I, WALDO P. CRAIG, of Milton, Trimble county, and State of Kentucky, have invented certain new and useful Improvements in Baling-Presses; and I do hereby declare the following to be a full, clear, and exact description thereof, reference being had to the accompanying drawings, making part of this specification.

My improvement relates, in part, to a provision whereby the advantages of tramping are secured in a portable baling-press, and also, in part, to an arrangement which enables the hooping of the bale to be effected outside of the press.

Figure 1 is a side elevation of my machine in condition for tramping. Fig. 2 is a longitudinal section through the same represented in the act of pressing. Fig. 3 shows the bale after being pressed and before it has been hooped. Fig. 4 is a view of the clamp and tie-bar detached.

A represents a horizontal bed, from which rises a vertical frame, B, whose transom C contains a journal-bearing for the upper end of the screw D. The screw D has also a bearing in the frame A, and has attached to its lower extremity the sweep O. The bed A supports on friction-rollers $a$ $a'$ $a''$ the carriage E, having two stout abutments, E' E'', to one of which, E'', the outer arm, F', of the toggle F F' is hinged, the inner arm, F, of said toggle being hinged to the follower G, which runs on the friction-rollers $g$ $g'$.

I render my press available for tramping by means of a device which I call the "tumbling-box," and which is arranged and operated as follows: The vertical sides of the carriage E contain two horizontal slots, $e$, to receive the trunnions $h$ of the tumbling-box H, which box, when liberated so as to revolve on its trunnions, assumes the vertical position, as shown in Fig. 1. The slots $e$ permit the strain to be brought to bear against the abutment E and relieve the trunnions $h$ of any strain whatever during the time the pressing is being effected. The tumbling-box H having been allowed to assume the vertical position, a slab, K, is deposited in its lower end, and the door L (of which there is one on each side of the tumbling-box H) being closed, the charging and tramping is commenced at the open end H' of the tumbling-box. The external faces of both of the slabs K K' are grooved at J to receive the rectangular clamp-bars M M', which, being inserted when the hay has become sufficiently compressed and their ends secured from separation by the tie-bars N N', enable the removal of the bale. Before the commencement of the pressing the upper and outer slab, K', is inserted, so that the bale is confined on opposite sides by slabs corresponding in area to the length and breadth of the bale, which slabs, intervening between the clamp-bars and the hay, confine the latter to its proper shape and dimensions for hooping. Grooves $k$ in the inner faces of the slabs K K' enable the insertion of the hoops after the removal of the clamped hay from the press. In the act of pressing the bottom (now inner end) of the tumbling-box H bears firmly against the abutment E' of the carriage, and the pressing is effected by the simultaneous approach of the abutment E' and follower G.

P is a floor or platform on which the press stands, and the sweep O may either revolve under the floor, as shown in Fig. 1, or it may be attached to the upper end of the screw D, and be operated in a room above that in which the press is situated.

I claim herein as new and of my invention—

1. The tumbling-box H, substantially as described and set forth.

2. The arrangement of tumbling box or trunk H, trunnions $h$, slots $e$, and abutment E', substantially as set forth.

3. While disclaiming the general idea of hooping bales outside the press, I claim the combination of the U-formed clamp-irons M M', tie-bars N N', and grooved clamp-boards or slabs K K', when constructed and employed as specified.

In testimony of which invention I hereunto set my hand.

W. P. CRAIG.

Witnesses:
 GEO. H. KNIGHT,
 JAMES H. LAYMAN.